March 12, 1963 A. J. HASTINGS ET AL 3,081,059
SEAT BASE
Filed June 2, 1961

INVENTORS
ALLAN J. HASTINGS
EDWARD C. JULIAN
BY
ATTORNEY

United States Patent Office 3,081,059
Patented Mar. 12, 1963

3,081,059
SEAT BASE
Allan J. Hastings, Wichita, and Edward C. Julian, Lawrence, Kans., assignors to The Boeing Company, Wichita, Kans., a corporation of Delaware
Filed June 2, 1961, Ser. No. 114,400
8 Claims. (Cl. 248—376)

Our invention concerns a lightweight seat base having an inverted cone secured to the underside of the seat and tripod legs secured to the cone. The seat may be reclinable and/or swivel mounted. The seat base is particularly adapted for aircraft but may be used in other applications.

The description of the invention will have the following order: (a) a brief summary of the principal structural elements, (b) the problems to which the invention is addressed and a statement of objectives, (c) the figure descriptions, (d) the detailed structure, and (e) the operation of the seat base.

Brief Description

To further briefly describe the base, the cone is flanged, the flange is received in a ring-shaped housing, and ball bearings are provided in the flange whereby a swivel suspension system for the seat is achieved. Two front legs are pivotally mounted on the floor and the back leg telescopes against the action of a spring for reclining the seat. During landing, the seat is disposed in a reclined position and in the event of a crash the rear leg acting to retard forward tilting of the seat by the creation of a vacuum in a cavity therein. This means that the occupant is not subjected to as high a G-loading as would be the case in a stationary seat. One primary characteristic loading requirements and operating objectives in normal and crash conditions.

Problems and Objectives

In aircraft design the minimization of weight is a primary consideration. Present day seats have relatively high bulk and weight of structural materials and the constructions are not directly responsive to stress loads applied. Most of the seats look bulky and do not have the crisp, lightweight appearance that is found in the aircraft and in the equipment in general and that reflects the philosophy of minimizing weight to the extent that functional considerations permit. The prior seats appear to average about 45 to 65 pounds each. Only one "luxury" seat has been found on the market weighing as low as 45 pounds. It is an object of my invention to substantially reduce the weight of the seat in the base thereof. Construction of the present seat base of die-cast aluminum and the like, and use with a seat of lightweight construction, such as an acrylic plastic shell and a fabric-covered foam rubber cushion insert, appears to achieve a design meeting all requirements and weighing as low as 15 pounds per chair and 25 pounds for a double seat in a high density aircraft seat arrangement.

Following the methods and philosophy of industrial design, exact analysis of structural and operating requirements, and keying the appearance to functional themes, achieve an aircraft seat base design with minimum weight and with a functional appearance in keeping with aircraft design in general. It is felt that most of the present-day aircraft seats do not meet such standards, e.g., the structures to achieve the necessary functions are not reduced to their simplest forms and the ornamentation tends to be a covering to conceal the nature of the seat bases. It is an object of our invention to provide a simple base structure meeting structural and operating requirements and providing an appearance expressive of the nature of the seat. It will be understood in the art how this chair can be adapted to non-aircraft use while maintaining at least part of the same features so that a contemporary chair base is provided of minimum weight, bulk, complexity and cost.

Under crash conditions the requirements of a seat base include sufficient strength to take the maximum G-loading of seat and occupant. Another important function is to minimize G-loading on the occupant. The passenger can better take the G-loading in a reclined position than in an upright position. G-loading can be modified if the seat tilts during crash deceleration. The technique is to delay and reduce the peak load taken by the passenger. It is an objective of our invention to provide for seating of passengers in reclined positions during landing and to reduce harmful effects during a crash by permitting forward tilting of the seats in a controlled manner. It is a further objective to provide sufficient strength in a minimum weight chair to sustain crash G-loadings.

Other objectives of the invention include: to provide a seat base of minimum bulk, low maintenance, and low cost. Additional objectives and advantages of the seat base will be understood from the following description.

The Drawings

Detail Structure

Figure 1:
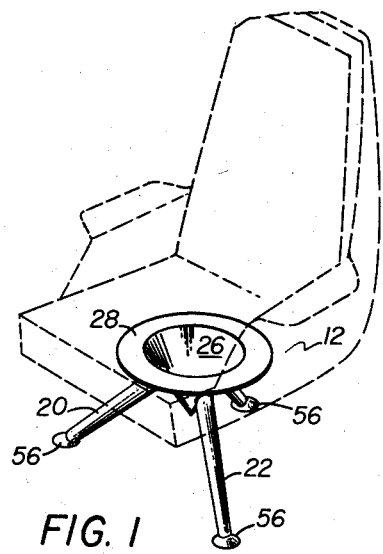
FIGURE 1 is a perspective view of a seat base forming a specific embodiment of our invention. A suitable seat for the base is indicated in dotted lines.
Figure 2:
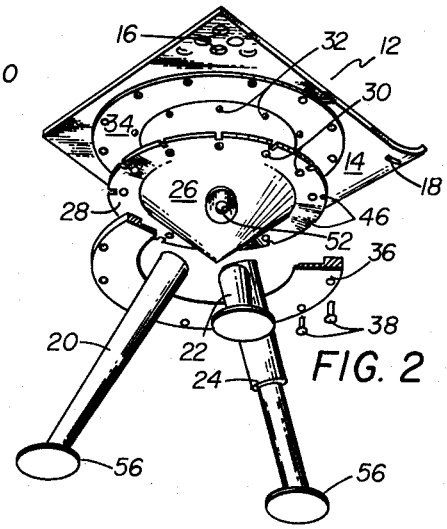
FIGURE 2 is an enlarged, exploded perspective view of the seat base viewed from below and one side.

The specific embodiment shown in the drawings is adapted for aircraft use. FIGURE 1 indicates in dotted lines seat 10 disposed on the base 12. The base is usable with various forms of seats but to carry out the idea of a low weight seating system, a seat should have a construction of low bulk and weight such as a plastic shell and foam cushions therein. Plate 14 may be an aluminum sheet perforated as at 16 for lightness or to allow such plastic seat shell to be molded into integral engagement therewith. Openings 18 in the rear corners of plate 14 are for the connection of a seat belt thereto.

For the seat system to work, the supports may be divided into forward leg means and rear leg means and the functional requirements are believed to be best achieved with tripod legs including two forward legs 20, 22 and a rear leg 24. The legs connect to plate 14 through a die-cast aluminum cone 26. The cone is shaped at an angle so that the legs are perpendicular to the cone when the seat is in upright position. In the reclined position of the back leg, indicated in dotted lines in FIGURE 3, the back leg is about 23° from its original position.

Cone 26 is formed with an integral flange 28 about its upper, or base, edge. Flange 28 has holes 30 drilled in a circular, evenly spaced pattern and Teflon ball bearings are set in holes 30 for antifrictional support of seat 10 in swiveling action. "Teflon" is a trademark of Dupont for polytetrofluoroethylene products. Plate 14 is formed with a ball-bearing raceway 34 forming one of the bearing surfaces for ball bearings 32. The other raceway is formed by a stamped aluminum ring 36 that is secured to plate 14 by screws 38.

Plate 14 may be latched to flange 28 in normal and other positions against swiveling of the seat by a latch piece 40 slidably received in a housing 41 secured to base 14 by bolts 42 and spring loaded by spring 44 to tend to seat in recesses 46 in flange 28. Control of latch 40 may be accomplished by a flexible cable 48 having a wire 50 attached to latch 40 and operated by a control on seat 10.

The tapered front legs 20, 22 are aluminum tubular shafts that are interiorly threaded at top and bottom. Plugs 49 are threadedly engaged in the upper ends of legs 20, 22. A bolt 50 extends through an opening 52 in cone 26 and is engaged in a threaded opening in the plug 49 of each forward leg. At the lower end of both the front and rear legs there are socket members 56 securing the legs to the aircraft floor 58 as by bolts 60. Socket members 56 have upper portions 62 secured in a suitable manner, as by welding, to lower portions 64. A seat is formed in each socket member 56 receiving a ball end 68 on a bolt member 66. Threaded shanks 70 of bolt members 66 for the forward legs are threadedly engaged in the lower ends of the legs 20, 22. Threaded shank 70 of the bolt member 66 for the rear leg is similarly secured in rear leg 24. The ball and socket assemblies permit pivoting of seat base 12 about the lower ends of forward legs 20, 22 and permits adjustment of angular position of rear leg 24.

Figure 3:
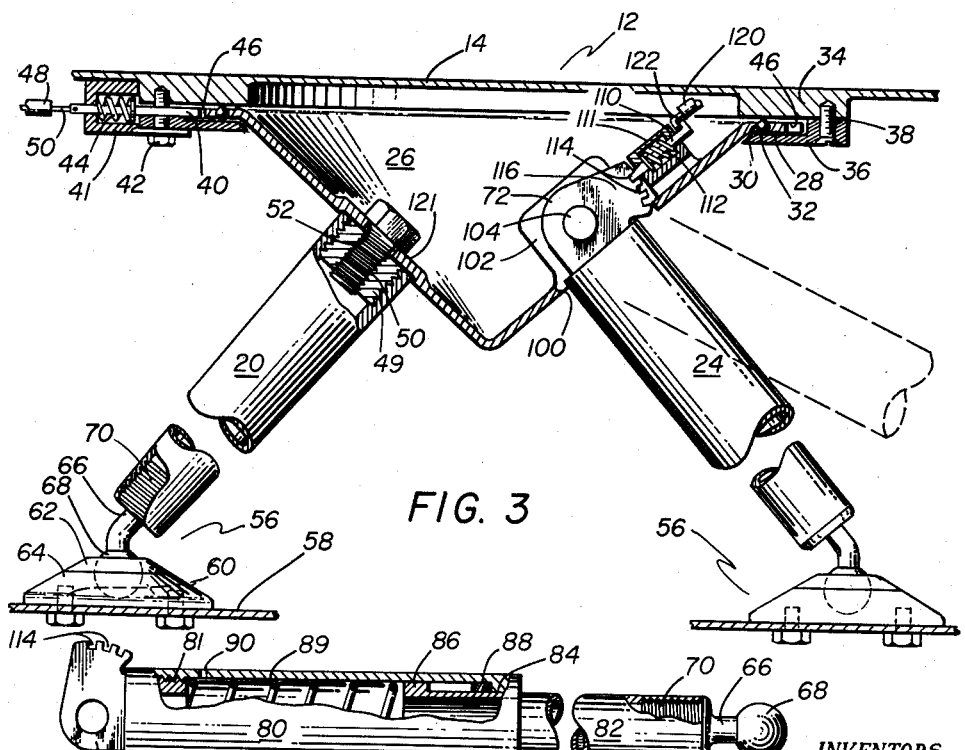
FIGURE 3 is an enlarged side view of the base shown partly in section.
Figure 4:
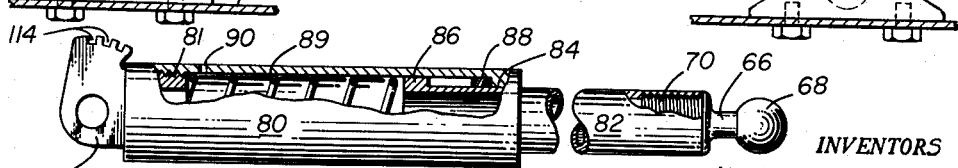
FIGURE 4 is a side view of the telescoping rear leg shown partly in section.

Seat 10 has an upright position, indicated in full lines in FIGURE 3, and has a reclined position, indicated by the dotted lines relative shift of position of rear leg 24 in FIGURE 3. It may have one or more intermediate positions. The tilting of the seat is not only for passenger comfort but is also to position the passenger in a reclining postion during landing to minimize injury in case of accident.

Rear leg 24 is formed by an upper and a lower telescoping portion 80, 82. The lower portion is threaded to secure the associated bolt member 66. The upper member 80 is threaded at 81 to secure the pivotal joint member 72 for joinder to cone 26. Lower member 82 fits within member 80 and the end interior and exterior flanges 84, 86 of portions 80, 82, respectively, form guides during telescoping action and form abutments limiting expansion of the leg. A Teflon or other compressible sealing ring 88 is bonded to the inside of upper tubular portion 80 adjacent flange 84 to form a seal between the tubes and, by compression thereof, to act as a buffer cushioning abutment of flanges 84, 86 and reducing maximum G-loading. Flange 86 may be of loose enough fit to prevent build-up of air pressure or vacuum between flanges 84, 86.

An orifice 90 to the space within the rear leg 24 provides air access to the leg cavity. Depending on the size of the orifice with relation to other parts, vacuum conditions are created within the leg cavity responsive to rapid expansion of leg 24 thereby creating a force tending to resist such expansion. The amount of force can be increased to a selected value by increasing leg diameter, more particularly the diameter of lower leg portion 82. The rear leg, therefore, may be increased substantially in size in some installations. Conversely, the orifice meters air during leg contraction and results in air compression resisting movement of the seat to the reclining position at too fast a rate. The leg pneumatic system could be adapted to reverse this relationship, e.g., produce air compression on leg expansion, but the present system is preferred. A spring 89 is positioned within tube 80 and abuts the flanged end 86 of tube 82 thereby normally tending to expand the rear leg and thereby urging seat 10 to an upright position.

Cone 26 has an opening 100 through which extends joint member 72 of rear leg 24. A lug 102 is formed by striking a portion of cone 26 into an inwardly extending position in the process of forming opening 100. Joint member 72 is pivotally joined to lug 102 by a pin 104. The leg is latched in various positions by a latch piece 110 slidably mounted in a housing 111 secured to cone 26. Latch 110 is pressed by a spring 112 into engagement with notches 114 in an arcuate portion 116 of leg joint member 72. The arc of notches 114 is centered at pin 104.

Movement of latch piece 110 into and out of engagement with notches 114 is accomplished through a flexible cable 120 having a wire 122 attaching to latch piece 110 and connecting at its other end to a control on seat 10.

*Operation*

It will be understood that in other than aircraft use, a lighter construction of base 12 can be used and the seat can be used with socket members 56 that do not have to be bolted to the floor. In aircraft usage the base is adapted for forward facing of the passenger when reclined, as in landing. In case rearward facing of passenegrs is elected in an aircraft to reduce injury from accidents, the basic structure and operating system can be adapted to this situation in various ways as will be understood by those working in the art.

The size and, consequently, the strength of the members will be selected to meet the requirements under maximum load during crash conditions. It is most important that the seats do not come loose from the floor. Another consideraetion is the positioning of the passengers. They will best accept the G-loads if they are reclining.

Presuming the passengers are disposed in reclining positions during landing and are faced in a forward direction, injuries or even fatalities can be reduced in event of crash if the peak G-loads can be reduced. The present seat is adapted for such reduction of G-loads by permitting controlled pivoting of the seat in a forward direction during such deceleration. The movement forward will depend on shearing of the latch pin 110 or other mechanical failure of the latch mechanism. Design for failure of the latch may be accomplished by the dimensions of latch piece 110 or by notching a portion thereof forming a section computed to fail under certain loads. The rate of deceleration is also responsive to the rate of forward movement of the seat after latch failure. This is controlled to a degree by the extent of vacuum formed within the rear leg responsive to rapid extension. Forward movement stops when sealing ring 88 has maximum compression between flanges 84, 86. The forwardmost position of the seat may be farther forward than the upright position shown in FIGURE 3.

It will be understood by those skilled in the art that the foregoing operation is susceptible of design to control, to a degree, the G-loading. The variables include the maximum aircraft deceleration, the weight of the passenger, the angles and lengths of the various system members, and the amount and effectiveness of the vacuum created. In general, the longer the time of operating the mechanism, the less the G-loading.

Weight has been minimized consistent with the system requirements. Only the functional members are provided and they are configured for minimum weight necessary to function. The appearance is believed to be appropriate for an aircraft seat.

When the expression "generally conically shaped body" is used in the claims to describe member 26, this is defined in the broad sense as including pyramids, domes and like bodies that taper between a base and an apex (the body being inverted, the base edge is at the top, abutting seat 10, and the apex is at the bottom). The body may have the form of a frustum so that the apex of the form is beyond the body. Whereas the true cone is an efficient form to carry loads between the legs and the seat, substantially maximizing strength in relation to weight, such other generally conically shaped bodies share the same advantage to an extent and may be preferred for manufacturing convenience or cost, i.e., legs 20, 22 are most conveniently attached if the cone is thickened and flattened in the area of abutment as indicated at 121 in FIGURE 3. Such generally conically shaped bodies as have open bottoms are distinguished from mere rings, such as is shown in Patent D. 180,865, by being defined as having at least as long sidewalls as base radii, this being a minimum consistent with sharing the strength characteristics of cones. The conically shaped body preferably will have a closed bottom for maximum resistance to deformation.

Having thus specifically described our invention, we do not wish to be understood as limiting ourselves to the precise details of construction shown, but instead wish to cover those modifications thereof which will occur to those skilled in the art from our disclosure and which fall within the scope of our invention, as described in the following claims.

We claim:

1. The improvement in a base for an aircraft seat mounted on a floor of an aircraft, comprising: a rigid, hollow, inverted cone and securing means securing the upper base edge of said cone to the underside of said seat, tripod legs connected to said cone at their upper ends and hingedly connected to said floor at their lower ends, said tripod legs including two forward legs and one rearward leg, the forward legs being rigidly secured to the sides of said cone intermediate its base and apex, said rear leg having upper and lower telescoping sections including resilient means normally urging said sections to expanded position whereby the seat is urged to an upper position and can be forcibly moved to a reclined position by pivoting about the lower ends of said forward legs, the upper end of said rear leg being pivotally secured to said cone intermediate its base and apex.

2. The subject matter of claim 1 in which said rear leg is hollow forming a leg cavity and has an orifice to said leg cavity of such size that expansion of the leg under crash conditions is influenced in rate of acceleration by the creation of a vacuum in said leg cavity.

3. The improvement in a base for an aircraft seat mounted on a floor of an aircraft, comprising: a rigid, hollow, inverted generally conically shaped body and securing means securing the upper base edge of said cone to the underside of said seat, forward and rear leg means hingedly secured to said floor at their lower ends, the forward leg means being rigidly secured to said body vertically medial of the sides of said body, said rear leg means being expandable and contractible and resilient means normally urging the rear leg means to expanded position whereby the seat is urged to an upper position and can be forcibly moved to a reclined position by pivoting about the lower end of said forward leg means, the upper end of said rear leg means being pivotally secured to said body medial of the sides of said body.

4. The subject matter of claim 3 in which there is a latch between said body and said rear leg means securing the seat in said reclined position, the latch being adapted to be broken upon application of sufficient force in crash conditions whereby said seat may move from said reclined to said upper position during such crash conditions.

5. The subject matter of claim 3 in which said securing means includes an annular flange on the upper base edge of said body, bearing means including a ring member on the upper side of said seat enclosing said flange and forming opposed ball-bearing raceways and said flange housing ball bearings seated in said raceways whereby said seat is swivelly mounted on said base.

6. The subject matter of claim 5 in which there are latch means operative to secure said seat in normal position against swiveling.

7. The improvement in a base for a seat, comprising: a rigid, hollow, inverted generally conically shaped body, first and second leg means having their upper ends secured to opposite sides of said body and extending downwardly and outwardly therefrom to bear on the floor or the like, said second leg means having upper and lower telescoping sections, resilient means normally urging said sections to expanded position whereby the seat is urged to an upper position and can be forcibly moved to a reclining position by pivoting about the lower end of said first leg means, said second leg means having fluid means including a cavity in said second leg means acting to oppose expansion of said second leg means at a rate above a selected level of acceleration.

8. The improvement in a base for a seat, comprising: tripod legs including first and second legs on one side and a third leg on the other side, securing means securing the upper ends of said legs to the underside of said seat, said legs extending outwardly and downwardly from said securing means to bear on the floor or the like, said third leg having upper and lower telescoping sections, resilient means normally urging said sections to expanded position whereby the seat is urged to an upper position and can be forcibly moved to a reclining position by pivoting about the lower ends of said first and second legs, said third leg having fluid means including a cavity in said third leg acting to oppose expansion of said third leg at a rate above a selected level of acceleration.

References Cited in the file of this patent

UNITED STATES PATENTS

| | | |
|---|---|---|
| 422,673 | Werner | Mar. 4, 1890 |
| 1,288,216 | Sayles | Dec. 17, 1918 |
| 2,598,788 | Hamilton | June 3, 1952 |
| 2,604,815 | Engelman | July 29, 1952 |
| 2,932,479 | Leach | Apr. 12, 1960 |
| 2,959,207 | Brewster | Nov. 8, 1960 |
| 2,978,012 | Norseen | Apr. 4, 1961 |